United States Patent [19]
Hentzschel

[11] Patent Number: 5,186,571
[45] Date of Patent: Feb. 16, 1993

[54] FENCE RAIL BRACKET

[75] Inventor: Walter G. Hentzschel, Weirton, W. Va.

[73] Assignee: Desco Corporation, McKenzie, Tenn.

[21] Appl. No.: 637,811

[22] Filed: Jan. 7, 1991

[51] Int. Cl.$^5$ .......................... F16B 7/04; E04H 17/14
[52] U.S. Cl. ................................. 403/231; 403/232.1; 403/403; 256/65; 52/712
[58] Field of Search ...................... 403/232.1, 230, 205, 403/382, 403, 231, 233, 191; 256/65, 59; 52/712, 715, 704

[56] References Cited

U.S. PATENT DOCUMENTS

| | | | |
|---|---|---|---|
| 949,075 | 2/1910 | Hulett | 256/65 X |
| 1,820,206 | 8/1931 | Wilson | 403/231 |
| 3,188,696 | 6/1965 | Earhart | 52/712 X |
| 3,423,898 | 1/1968 | Tracy et al. | 52/713 |
| 3,669,480 | 6/1972 | Fugate . | |
| 3,703,304 | 11/1972 | Losee | 52/712 X |
| 3,967,908 | 7/1976 | Snow et al. | 403/231 X |
| 4,114,861 | 9/1978 | Long | 403/232.1 X |
| 4,192,118 | 3/1980 | Gilb | 52/714 |
| 4,410,294 | 10/1983 | Gilb et al. | 403/27 |
| 4,414,785 | 11/1983 | Howell | 403/191 X |
| 4,422,792 | 12/1983 | Gilb | 403/232.1 |
| 4,498,801 | 2/1985 | Gilb | 403/232.1 |
| 4,526,348 | 7/1985 | Cammack | 256/65 |
| 4,560,301 | 12/1985 | Gilb | 403/232.1 |
| 4,616,950 | 10/1986 | Morris | 403/231 |
| 4,665,672 | 5/1987 | Commins et al. | 52/295 |
| 4,893,961 | 1/1990 | O'Sullivan et al. | 403/232.1 |

Primary Examiner—Peter M. Cuomo
Attorney, Agent, or Firm—Burns, Doane, Swecker & Mathis

[57] ABSTRACT

A fence rail section has a metal bracket for attaching a rail to a post. The bracket is symmetrical and sized to conform to the maximum and minimum cross-sectional dimensions of the rail. Extending from the base portion of the bracket are a pair of L-shaped ears and a rectangular tab which cooperate to define a socket to receive an end of the rail either laterally or longitudinally. Exposed-post fences are readily erected using these brackets.

3 Claims, 3 Drawing Sheets

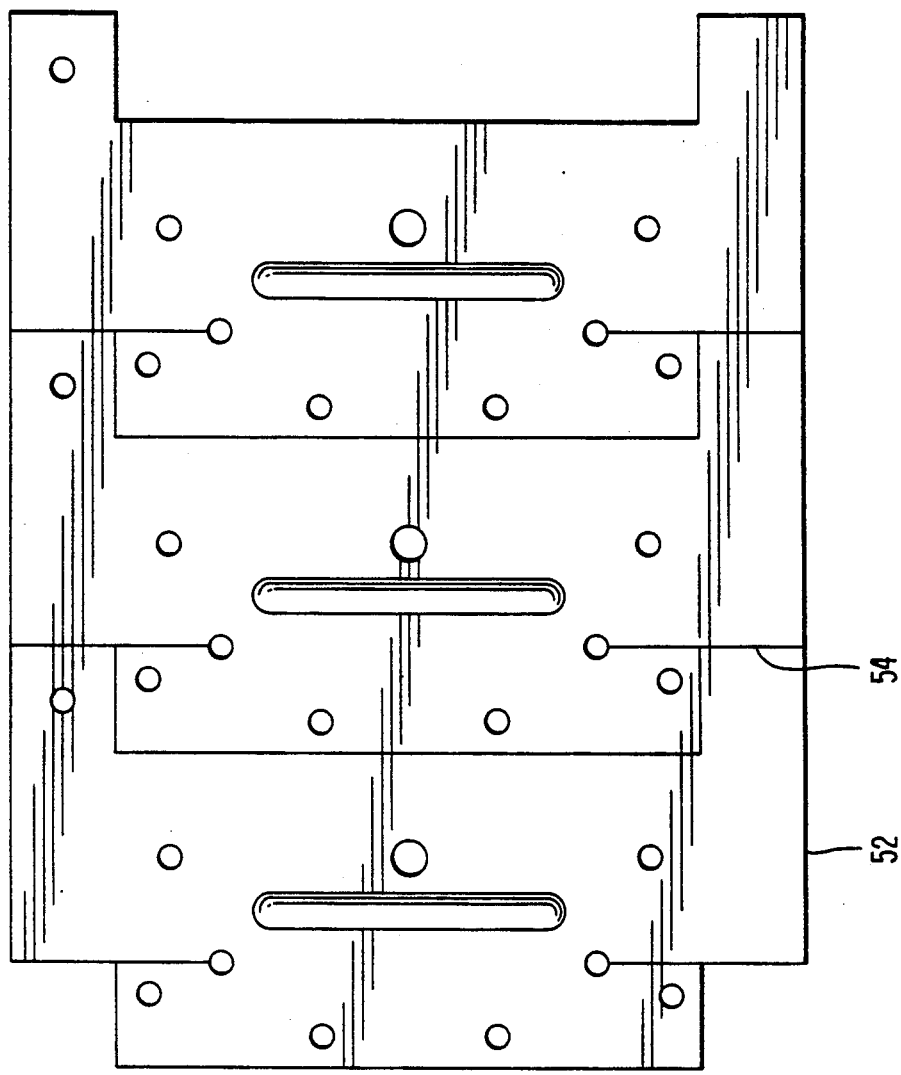
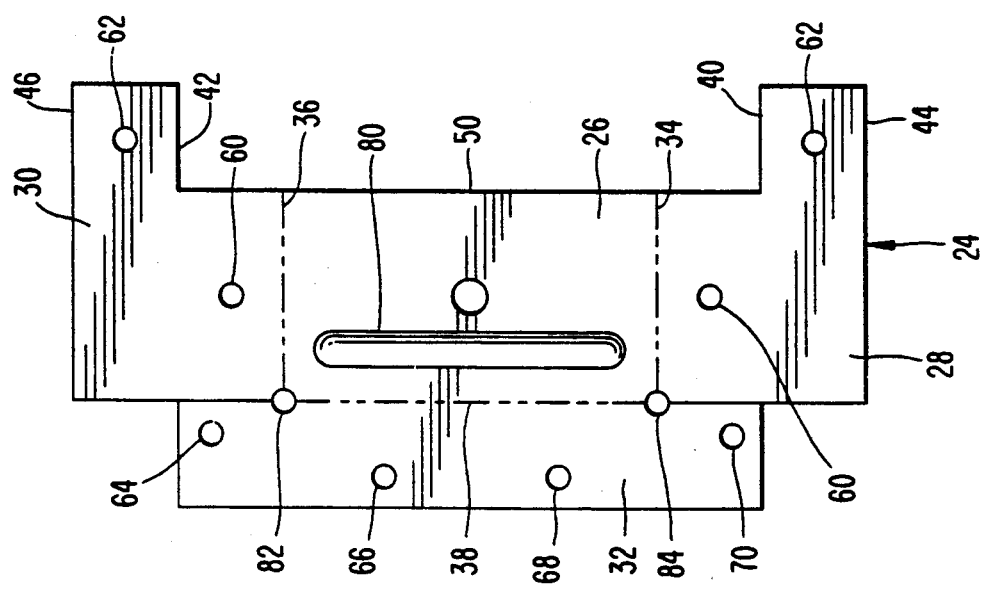

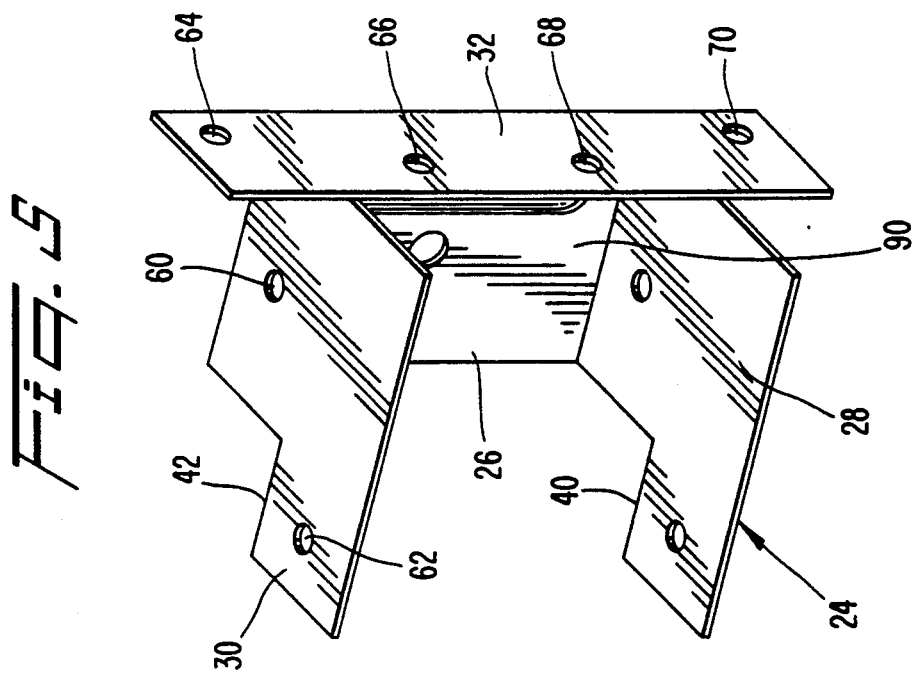
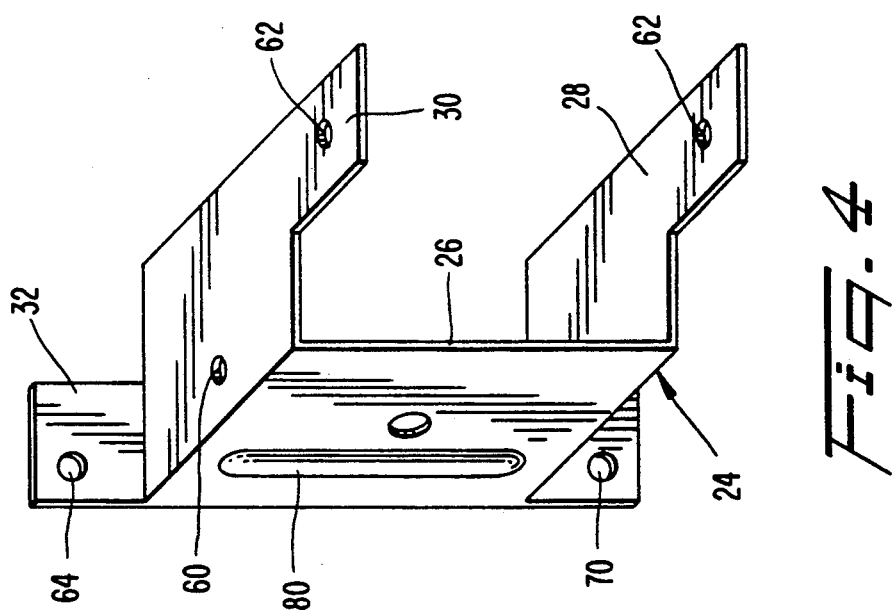

FENCE RAIL BRACKET

BACKGROUND OF THE INVENTION

The present invention relates generally to devices for simplifying construction using wooden members. More particularly, the present invention deals with a metal bracket for use in constructing fences and similar devices using post and beam techniques.

In the past, erection of fences involved installation of posts at predetermined intervals, followed by connection of fence rails between adjacent pairs of posts. That connection ordinarily involves toenailing (nailing on a diagonal to the end of the rail). Sometimes, the fence consisted only of posts and rails. Other times, facing elements such as pickets and the like were attached to the rails.

More recently, prefabricated fencing panels have been used. Typical prefabricated fencing panels include both fence rails and facing elements. The prefabricated fencing panels are usually nailed to the face surface of posts, which have been installed with prior methodology.

As a result of the techniques using prefabricated panels, the displayed side of the fence shows a continuous, uninterrupted pattern of fence facing along its entire length. Aesthetically, it is desirable to have sections of fence facing broken by the visual presence of a post. When working with prefabricated fencing panels, it has been possible to build a fence such that the posts are exposed. However, to do so, rails of the prefabricated panel sections must be toenailed to the adjacent posts. While professional fencing contractors can accomplish such results, toenailed joints between the rails and the posts are undesirable: the toenailed joints are at the very ends of the rails and are thus relatively weak; it is difficult to get access to opposite sides of the rails to perform the toenailing; the weight of prefabricated fencing sections is such that a second workman is often needed just to support the fence section until the joint with a post is made; and, it is frequently necessary to remove one or more of the facing elements adjacent to the post in order to make the joint. While the latter point may seem trivial, in view of the fact that facing elements of most prefabricated fence sections are attached with screw-nails, removal of facing elements without damaging or destroying them is quite difficult.

Occasionally, the posts are notched or otherwise specially prepared to receive rails of the prefabricated fencing panels. Although this approach can help alleviate the need for another workman to support the section while it is joined to a post, the notches both weaken the posts and require additional skilled work.

In addition, many homeowners and novices prefer to undertake projects such as fencing by themselves, in part because to the economic savings. Unfortunately, carpentry skills for many such homeowners and novices have not reached a high level. Thus, projects such as fencing that require skill and experience in toenailing are more difficult for such persons than may appear at first blush.

The present invention seeks to provide a prefabricated bracket that expedites fabrication of exposed post fences using prefabricated panels while obviating the need for toenailing in fence erection projects. Such a bracket not only simplifies fence erection projects for homeowners, it also reduces the required skill level of workmen employed by fencing contractors. Thus, even where a property owner elects to hire a fencing contractor, economic benefits in the form of reduced costs may be anticipated.

Brackets for a variety of construction applications are of course known in the art. For example, combination anchors and braces are known for securing studs adjacent to plates on the floor of a building. Such a combination device can include a plate with a longitudinal side wall and a pair of upstanding flanges, see U.S. Pat. No. 3,188,696, issued to Earhart on Jun. 15, 1965. A socket for mounting a guard rail which has a base portion with a pair of side walls from which other tabs are bent is disclosed in U.S. Pat. No. 3,669,480, issued to Fugate on Jun. 13, 1972.

Multiple piece connectors are known for connecting plates with rafters and rafters to ridge boards, see for example U.S. Pat. No. 3,967,908, issued to Snow et al. on Jul. 6, 1976, and U.S. Pat. No. 3,423,898, issued to Tracy et al. on Jan. 28, 1969.

Similar devices made by forming a single piece of metal into various shapes are also known: a variable pitch connector, U.S. Pat. No. 4,410,294, issued to Gilb et al. on Oct. 18, 1983; a ridge rafter connector, U.S. Pat. No. 4,498,801, issued to Gilb on Feb. 12, 1985; a one piece, non-welded holdown, U.S. Pat. No. 4,665,672, issued to Commins et al. on May 19, 1987; and a joist hanger, U.S. Pat. No. 4,893,961, issued to O'Sullivan et al. on Jan. 16, 1990.

However, none of those prior art devices are known for use in connection with exposed-post fence construction or post and beam construction. Furthermore, the prior art devices typically require access to both sides of a rail, which is undesirable as discussed above.

SUMMARY OF THE INVENTION

Accordingly, it is a general object of the present invention to provide a fence rail bracket which overcomes the problems discussed above. Furthermore, it is an object of this invention to provide a fence section and a method of constructing a fence which overcomes the problems and disadvantages of prior devices and methods.

To those ends, a fence rail bracket in accord with the present invention includes a one-piece metal member having a base portion with a major dimension corresponding to the maximum cross-sectional dimension of a fence rail, a pair of L-shaped ears disposed perpendicularly to the base portion and having a height corresponding to the minimum cross-sectional dimension of the fence rail, and a stiffening member disposed perpendicularly to the base portion and to both of the ears, having a length exceeding the maximum cross-sectional dimension of the fence rail.

In order to minimize waste of material, ends of the L-shaped ears extend beyond the base portion a distance corresponding to the height of the stiffening member. Moreover, the ends of the L-shaped ears are displaced from the base portion by a distance corresponding to one half of the difference between the length of the stiffening member and the length of the base portion. With that proportional arrangement, formation of the bracket is devoid of waste other than the material punched out for nail holes.

Considering the weight and cost advantages associated with using a minimal amount of material, the base portion may be provided with a stiffening rib. In that manner, the material thickness can be reduced without sacrificing rigidity.

The bracket is also distinguished by the presence of strain relieving holes located at the junctions of fold lines and cut lines. Such holes are effective to prevent stress cracking and associated weakening of the bracket.

When the bracket according to the invention is used to attach a fence rail to a fence post, numerous advantages result. For example, the end of the fence rail can be cut at an angle which is not perfectly perpendicular to the longitudinal extent of the rail. When the rail is attached by nailing to the bracket, the bracket will accommodate considerable deviations from perpendicularity. Moreover, lack of precision in the length of the rail is also accommodated. While the most desirable arrangement is for the end of the rail to be in abutment with the stiffening element, the closely enveloping relationship between the bracket and the outside of the rail combines with the nailed connection to allow considerable variation in the rail length.

Through use of the bracket, it is possible to mount prefabricated fence section to a post without notching the post. Such a result is accomplished by locating the bracket on a side of the post and setting the bracket back from the front of the post by a distance corresponding to the thickness of the panel.

The bracket also is designed to minimize the danger of splitting either the post or the fence rail from nails. In particular, the nail holes provided in the base portion, the ears and the stiffening tab are offset from one another so as to minimize strain on fibers of the wooden members.

BRIEF DESCRIPTION OF THE DRAWINGS

Those and many other objects and advantages of the present invention will be apparent to those skilled in the art when this specification is read in conjunction with the appended drawings wherein like reference numerals are applied to like elements and wherein:

FIG. 2 is a plan view of a blank from which a bracket according to the present invention is made;

FIG. 3 is a plan view of bracket blanks according to this invention;

FIG. 4 is a perspective view of a bracket according to the invention; and

FIG. 5 is a perspective view of the bracket of FIG. 4 rotated through an angle of about 150° to show the interior surface.

DETAILED DESCRIPTION OF THE PREFERRED EMBODIMENT

Figure 1:
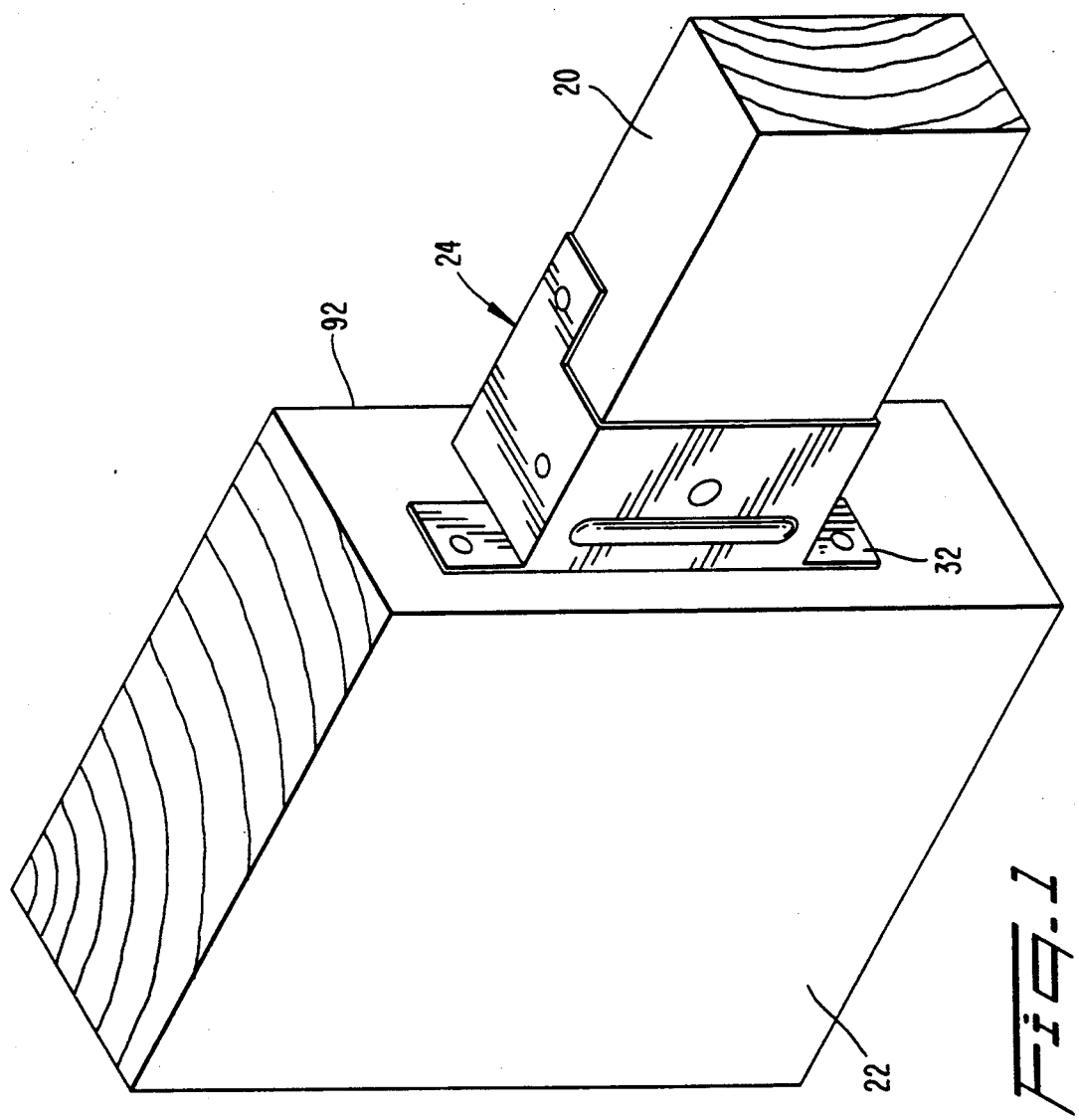
FIG. 1 is a perspective view of a fence rail to post connection accomplished through use of a bracket in accordance with the present invention.

A horizontally disposed fence rail 20 (see FIG. 1) having a maximum cross-sectional dimension and a minimum cross-sectional dimension is attached to a vertically upstanding wooden fence post 22 using a metal fence rail bracket 24 according to the present invention. The fence rail bracket 24 is sized for the actual cross-sectional dimensions of a nominally sized piece of lumber used for the rail 20. Accordingly, a differently sized bracket 24 is used for each different size of rail. The bracket 24 is designed so that each fastening nail can be driven substantially perpendicularly to the wood surface into which it is driven. Such a design eliminates the need for toenailing. As a result, the bracket 24 facilitates assembly of fence posts and fence rails. Similarly, the bracket 24 can be used in mounting beams to posts in post-and-beam constructions.

In addition to elimination of diagonal or toenailing, the bracket 24 also accommodates another potential inaccuracy that commonly occurs when inexperienced property owners or unskilled laborers erect fences. More specifically, when inexperienced laborers cut the fence rail 20 to fit between two adjacent posts 22, the length measurement is not always exact. In addition, the actual saw cuts made by such persons are not always square, i.e., perpendicular to the side surfaces of the rail. Furthermore, when the end of the rail 20 is not cut, it is not necessarily square. Those lacks of squareness and inaccuracies in the length lead to tolerances or spaces between the end of the rail 20 and the post 22. Such tolerances or spaces are readily overcome and accommodated by the fence rail bracket 24 since it operates as a telescoping sleeve between the end of the rail 20 and the associated post 22.

Each fence rail bracket 24 is preferably fabricated from a single piece of suitable material. Generally, metal such as steel is a suitable material. To protect the material from exposure to the elements, the steel may be zinc-coated. The steel should also be as thin as possible while providing the requisite strength, 18 gauge thickness has been found to be suitable. During fabrication, the bracket 24 is formed as a flat, planar member (see FIG. 2).

The fence rail bracket 24 has a generally planar body portion 26, a pair of ears 28, 30, and an elongated generally rectangular tab 32. The ears 28, 30 are separated from the body portion 26 by a corresponding pair of parallel bend lines 34, 36. Another bend line 38 separates the elongated tab 32 from the body portion 26. The length of the body portion 26 between the parallel bend lines 34, 36 is selected to be the same as the maximum actual cross-sectional dimension of the fence rail 20. The width of the body portion 26 is selected to be any convenient dimension.

Each ear 28, 30 is positioned at a corresponding opposed end of the body portion 26. Each ear 28, 30 broadly has the shape of an L with a first portion oriented in the longitudinal direction of the bracket blank and a second portion oriented transversely with respect to the longitudinal direction of the bracket blank. Those first and second portions of each ear 28, 30 are identically proportioned and are mirror images of one another about an axis of symmetry positioned transversely of the blank, and at the center thereof. Each first portion has a length that corresponds to the minimum actual cross-sectional dimension of the rail with which it is used. Thus, the overall length of the blank from which the bracket is formed corresponds to the sum of the maximum actual cross-sectional dimension of the rail plus twice the minimum actual cross-sectional dimension of the rail. Moreover, each first portion cooperates with the associated second portion to define a notch 40, 42.

Those notches 40, 42 are positioned between the corresponding bend line 34, 26 and the corresponding parallel edge 44, 46 of the bracket blank and are offset from the corresponding bend line by a predetermined distance. Thus the notches 40, 42 define a recess 50 extending along one side of the blank with a length exceeding that of the body portion 26. As seen in FIG. 2, the recess 50 has a longitudinal length which is essentially the same as the longitudinal length of the elongated tab 32. Similarly, the recess 50 has a transverse width which is essentially the same as the transverse width of the elongated tab 32.

The generally rectangular elongated tab 32 has a length which exceeds the longitudinal length of the body portion 26 so that portions will be exposed for attachment to a post. Conveniently, each end of the tab 32 may extend beyond the length of the body portion by a predetermined distance corresponding to the width of the tab.

With that arrangement, the bracket blanks can be stamped from a single strip 52 of metal (see FIG. 3) using a single cutting line 54 to sever one bracket blank from the strip 52. From the interdigitated relationship of adjacent bracket blanks, it will be seen that there is essentially no waste when the brackets are stamped from a strip. The only identifiable waste is the minor amount resulting from making the various holes through each blank.

Each ear 28, 30 (see FIG. 2) preferably has two holes 60, 62 each being sized for receiving a nail. The two holes 60, 62 in each ear are not arranged in a transverse line. Rather, the holes 60, 62 are offset from one another. That positional arrangement of the holes 60, 62 is selected so as to minimize the likelihood that nails through those holes, into a rail, will be located between the same fibers of the wood, thereby reducing the risk of splitting at the end of the rail.

The elongated tab 32, on the other hand, has four holes 64, 66, 68, 70. Since the bracket 24 is not usually affixed to the very end of the post, there is less danger of splitting the post. Thus, these holes are arranged in two transversely offset pairs. The arrangement of the holes does, nonetheless, reduce the risk of splitting the wood in the post by virtue of the spacing.

Each of the holes 60, 62, 64, 66, 68, 70 is positioned so that it is no closer to any adjacent edge of the bracket than the diameter of the hole. With such spacing, there will always be a reasonable amount of bracket material between the hole and the edge to resist forces in the plane of the ear 28, 30 or in the plane of the elongated tab 32.

The body portion 26 also includes an integral stiffening rib 80. The rib 80 is formed when the blank is stamped. It extends nearly the full length of the body portion but does not overlap any of the bend lines 34, 36, 38. The rib 80 helps maintain the body portion in a generally planar condition when the ear 28, 30 and the elongated tab 32 are bent out of its plane. Bending of the body portion 32 would reduce its actual length and interfere with its use with standard dimension rails.

The blank is further provided with stress relief means comprising a pair of stress relief holes 82, 84, each located at the corresponding intersection of the bend line 38 with one of the bend lines 34, 36, i.e., each hole is located at a corner of the body portion 26, a corresponding ear, and the elongated tab 32. The stress relief holes 82, 84 are preferably about the same size as the nail-receiving holes discussed above. These stress-relief holes also function to help keep the body portion 26 planar during the bracket forming steps.

After various features are made on the blank and the blank has been separated from the strip, the blank is formed to the final configuration of the fence rail bracket 24 (FIG. 4). The ears 28, 30 are bent out of the plane of the body portion 26 so that they are parallel to one another and positioned perpendicularly relative to the plane of the body portion 26. In addition, the elongated tab 32 is bent out of the plane of the body portion 26 so that it is positioned perpendicularly to the plane of the body portion 26 and so that it is perpendicular to the ears 28, 30. With that arrangement, the bracket 24 defines an open pocket 90 (see FIG. 5) defined by the body portion 26 on one side, the ears 28, 30 on opposed sides, and the elongated tab 32 on the end. The pocket 90 is sized to the actual dimensions of a rail and is open at the notched ends of the ears 28, 30 to receive an end of the rail.

The fence rail bracket 24 (see FIG. 1) is nailed or screwed to a side surface of a post 22. The bracket 24 is positioned so that the pocket is set back from a face surface 92 of the post and the elongated tab 32 is parallel to that face. Nails can be applied to all of the holes 64, 66, 68, 70 (FIG. 5). Furthermore, the holes 66, 68 are spaced from the body portion 26 so that it is easy to insert nails and drive them into the post. It will be appreciated that the bracket 24 is symmetric about a transverse axis passing through the middle of the body portion. With that arrangement, the same bracket can be used at both ends of the rail without any apparent difference to the workman.

When brackets have been applied to side surfaces of adjacent posts, each bracket has its pocket with the open side toward the prefabricated fencing panel. Thus, one end of the fencing panel can be supported by the corresponding brackets while the other end is positioned in its bracket or brackets. Accordingly, it is not necessary for one workman to hold the fence section while another workman drives the nails or lag bolts to make the joint. Rather, each workman can nail through the brackets at corresponding ends of the same rail so that fence panels can be installed more rapidly.

When fencing is installed without prefabricated panels, the foregoing procedure is also used. However, the fence rail 20 (FIG. 1) having a face and parallel side surfaces is inserted in the pocket of the associated brackets 24 at each post. The rail 20 is secured by nails or screws applied though holes in the ears. It is not necessary to apply nails diagonally and connection of the rail to the post can be easily effected.

If desired, the fence section can have two or more generally horizontal rails. Moreover, decorative facing elements such as pickets, stockade boards, and the like may be attached to the rails. Generally, those facing elements have a predetermined thickness which will correspond to the offset between the face surface of the post and the bracket.

It should now be apparent to those skilled in the art that a new, useful and unobvious fence rail bracket has been provided which overcomes the problems of the prior art and which satisfies the objects of this invention. Moreover, it will also be apparent the there are numerous modifications, changes, and equivalents for various features of the invention that do not materially depart from the scope of this invention. Accordingly, it is expressly intended that all such modifications, variations, substitutions, and equivalents for features of the inventions which fall within the spirit and scope of the invention as defined by the appended claims be embraced thereby.

What is claimed is:

1. A fence rail bracket for use with a member having maximum and minimum cross-sectional dimensions comprising:

a generally planar body portion, having a longitudinal length essentially the same as the maximum cross-sectional dimension and a longitudinal stiffening rib;

a pair of L-shaped ears, disposed transversely of the body portion, parallel to one another, extending perpendicularly to the plane of the body portion by a distance essentially the same as the minimum cross-sectional dimension;

a generally rectangular tab disposed longitudinally of the body portion, extending perpendicularly to the plane of the body portion and being perpendicular to each of the L-shaped ears, having a length exceeding the maximum cross-sectional dimension, and a width no greater than the minimum cross-sectional dimension;

the planar body portion, the pair of L-shaped ears, and the generally rectangular tab defining a laterally open pocket;

wherein the body portion, the ears, and the tab are formed from a single metal piece;

wherein each of the L-shaped ears defines a notch;

wherein each notch is offset from the plane of the body portion by a predetermined distance; and wherein the sum of those predetermined distances and the length of the body portion is essentially equal to the length of the rectangular tab;

whereby material waste is effectively eliminated in the manufacturing process.

2. The fence rail bracket of claim 1 further including stress relief means positioned at a corner between the body portion, one ear, and the rectangular tab.

3. The fence rail bracket of claim 1 wherein the bracket is symmetric about a transverse axis passing through the center of the body portion so that the same bracket can be used at either end of a generally horizontal rail.

* * * * *